United States Patent [19]
Watanabe

[11] Patent Number: 6,022,550
[45] Date of Patent: *Feb. 8, 2000

[54] CROSSLINKABLE POLYMER COMPOSITION, MOLDED ARTICLE THEREFROM, PROCESS FOR THE PREPARATION THEREOF, CROSSLINKED NONWOVEN CLOTH, AND PROCESS FOR THE PREPARATION THEREOF

[75] Inventor: Kazushi Watanabe, Ohtake, Japan

[73] Assignee: Daicel Chemical Industries, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/932,840

[22] Filed: Sep. 18, 1997

[30] Foreign Application Priority Data

| Sep. 18, 1996 | [JP] | Japan | 8-267848 |
| Sep. 20, 1996 | [JP] | Japan | 8-271555 |
| Mar. 3, 1997 | [JP] | Japan | 9-063883 |
| Mar. 21, 1997 | [JP] | Japan | 9-087369 |

[51] Int. Cl.$^7$ .......................... A61K 31/74; A01N 25/34
[52] U.S. Cl. .................. 424/402; 424/78.03; 525/326.9; 525/388
[58] Field of Search ................. 525/326.9, 388; 264/48, DIG. 48, DIG. 62; 424/402, 78.03

[56] References Cited

U.S. PATENT DOCUMENTS

| 3,427,274 | 2/1969 | Cornell | 260/31.8 |
| 4,678,838 | 7/1987 | Janssen | 525/326.9 |
| 5,049,275 | 9/1991 | Gillberg-LaForce et al. | 210/500.27 |

*Primary Examiner*—Jose' G. Dees
*Assistant Examiner*—Kathryne E. Shelborne
*Attorney, Agent, or Firm*—Morgan & Finnegan, L.L.P.

[57] ABSTRACT

Disclosed are a crosslinkable resin composition, and a molded article from the composition, a process for the preparation of the crosslinkable polymer composition, and crosslinked nonwoven cloth having a shape-memory effect and a process for the preparation thereof.

The crosslinkable resin composition and the molded article of the present invention are excellent in chemical resistance.

34 Claims, No Drawings

CROSSLINKABLE POLYMER COMPOSITION, MOLDED ARTICLE THEREFROM, PROCESS FOR THE PREPARATION THEREOF, CROSSLINKED NONWOVEN CLOTH, AND PROCESS FOR THE PREPARATION THEREOF

FIELD OF THE INVENTION

The present invention relates to a crosslinkable polymer composition. Further, the present invention relates to a molded article prepared from the polymer composition. Still further, the present invention relates to a process for the preparation of the crosslinkable polymer composition.

Still further, the present invention relates to another crosslinkable polymer composition. Also, the present invention relates to a crosslinked molded article prepared from the crosslinkable polymer composition. In addition, the present invention relates to a process for the preparation of the crosslinkable polymer composition.

Besides, the present invention relates to crosslinked nonwoven cloth having a shape-memory property and a process for the preparation thereof.

The crosslinked molded article prepared from the crosslinkable polymer composition in the present invention is more excellent in a variety of properties such as mechanical strength, heat resistance, oil resistance, and scratch resistance compared to molded articles prepared from an uncrosslinkable polymer. Further, the molded article shows a so-called shape-memory property that it deforms while showing rubbery elasticity by an outer stress in melting, and it tends to restore to the original shape in remelting.

BACKGROUND OF THE INVENTION

Crosslinking between molecules of a crystalline polymer by irradiation of an active energy ray is a publicly known technology, and a crosslinking technology between molecules of a polyethylene by irradiation of an active energy ray is put to practical use as a coating layer for electric cables.

Further, it is also publicly known that a crystalline polymer shows a shape-memory effect by crosslinking. Even the active energy ray is directly irradiated to a polymer such as a polyethylene in which crosslinking is readily caused by irradiation of an active energy ray, and cleavage in the polymer chains and generation of odors are not readily caused, it is almost not problematic. However, it has been difficult to prepare a crosslinked molded article by directly irradiating to a polymer such as a polypropylene in which cleavage in the polymer chains is readily caused. Also, it is apparent that crosslinking by lower energy is preferred even in the polyethylene.

On the other hand, there has been also widely known crosslinking between molecules of a noncrystalline polymer by irradiation of an active energy ray, for example, JP-A-08059862 discloses an elevation of hardness in a polycarbonate resin and a polysulfone resin by irradiation of an active energy ray at a high temperature of approximately 150° C. However, even though the noncrystalline polymer is irradiated by an active energy ray at a state of room temperatures, hardness does not change.

Crosslinking of the noncrystalline polymer requires a large amount of irradiation energy by the active energy ray, or irradiation of the active energy ray at a high temperature. Therefore, there is a problem that there are occasionally caused cleavage of polymer chains, generation of odors, and discoloration in polymers, etc., whereby, it is not regarded as a practical crosslinking method.

In the meantime, it is known that a crystalline polymer shows a shape-memory property by crosslinking. Further, nonwoven cloth is prepared by netting a variety of synthetic fibers such as a polyester resin, a nylon resin, an aramide-based resin, an acrylic-based resin, a polyolefin-based resin, a polyurethane-based resin, a vinylon-based resin, a polyvinylchloride-based resin, a combination thereof, and moreover, natural fibers such as cotton, hemp, wool, and wooden pulp, a regenerated fibers such as rayon, and cupra, inorganic fibers such as glass, carbon, alumina, metal, and a variety of combinations thereof, from which a variety of products are prepared depending upon preparation processes to supply for a variety of uses.

However, conventional nonwoven cloth is not sufficiently satisfied in view of a recent demand for advanced functions in spite of being capable of obtaining a variety of functions depending upon selections in raw materials. For example, the nonwoven cloth in which the synthetic fibers are employed is quite beyond properties of inorganic nonwoven cloth in view of rigidity, tear strength, delamination resistance, and solvent resistance, etc.

On the other hand, although the conventional nonwoven cloth is generally more excellent in productivity and soft feel, etc., contrarily, it is poorer in strength, solvent resistance and heat resistance, etc.

In view of this background, and as a result of an extensive investigation, the inventor of this invention has now found that there can be obtained a crosslinkable polymer composition by crosslinking a specified noncrystalline polymer or a specified crystalline polymer together with a crosslinkable monomer by the irradiation of an active energy ray, whereby, crosslinked molded articles and nonwoven cloth can be obtained, in which there are improved chemical resistance, oil resistance, and scratch resistance without any loss of a variety of physical properties such as heat resistance, weatherability, and mechanical properties, and the present invention has been completed. The nonwoven cloth obtained is exceedingly excellent in rigidity, tear strength, and it shows a shape-memory property, excellent bulkiness and soft feel, resulting in that it can be employed as water-absorbable materials and filters, etc.

SUMMARY OF THE INVENTION

It is an object of the present invention to provide a crosslinkable polymer composition which can provide a crosslinked molded article having excellent properties such as mechanical strength, heat resistance, oil resistance, and scratch resistance, and moreover which has a shape-memory property compared to uncrosslinked molded articles.

A first aspect of the present invention relates to a crosslinkable polymer composition which comprises 100 parts by weight of a noncrystalline polymer (A) having a number average molecular weight ranging from 10,000 to 300,000 and 0.1 to 30 parts by weight of a crosslinkable monomer (B) which can bind molecular chains of the noncrystalline polymer (A) by the irradiation of an active energy ray.

A second aspect of the present invention relates to a crosslinked molded article obtained by irradiation of an active energy ray after molding the crosslinkable polymer composition.

A third aspect of the present invention relates to a process for the preparation of a crosslinked molded article which comprises irradiating an active energy ray after molding the crosslinkable polymer composition.

A fourth aspect of the present invention relates to a crosslinkable polymer composition which comprises 100 parts by weight of a crystalline polymer (A) having a number average molecular weight ranging from 10,000 to 300,000 and a melting point of not less than 90° C., and 0.1 to 30 parts by weight of a crosslinkable monomer (B) which can bind molecular chains of the crystalline polymer (A) by the irradiation of an active energy ray.

A fifth aspect of the present invention relates to a process for the preparation of a crosslinked molded article which comprises irradiating an active energy ray after molding the crosslinkable polymer composition.

A sixth aspect of the present invention relates to a crosslinked molded article obtained by irradiation of an active energy ray after molding the crosslinkable polymer composition by a compression molding, a vacuum molding, a blow molding, and an injection molding or a foaming molding.

A seventh aspect of the present invention relates to a crosslinked nonwoven cloth having a shape-memory property which comprises crosslinking by irradiating an active energy ray.

An eighth aspect of the present invention relates to a process for the preparation of crosslinked nonwoven cloth characterized by the steps;

(a) spinning a resin composition composed of 100 parts by weight of a polymer (A) and 0.1 to 30 parts by weight of a crosslinkable monomer (B) which can bind molecular chains of said polymer (A) by irradiation of an active energy ray to prepare fibers, (b) preparing a nonwoven cloth by entangling said fibers, and (c) said nonwoven cloth being irradiated by said active energy ray.

DETAILED DESCRIPTION OF THE INVENTION

The present invention will be described hereinafter in more detail.

According to a first aspect of the present invention, there is provided a crosslinkable polymer composition which comprises 100 parts by weight of a noncrystalline polymer (A) having a number average molecular weight ranging from 10,000 to 300,000 and 0.1 to 30 parts by weight of a crosslinkable monomer (B) which can bind molecular chains of the noncrystalline polymer (A) by the irradiation of an active energy ray.

Although the noncrystalline polymer (A) to be employed in the crosslinkable polymer composition of the present invention is not particularly limited, there is preferably employed a polymer having a crystallized degree of not more than 20%, preferably not more than 10% which is measured by an X ray analytical method.

Specifically, there can be employed a styrene-based resin or an elastomer prepared from any copolymerizable monomers, an acrylic-based resin, a vinyl-based resin, a polycarbonate resin, a polyphenylene ether-based resin, a butylal resin, and a polyolefin-based resin or an elastomer thereof.

The noncrystalline polymer can be employed solely or in combination of one or more kinds. Further, there can be mixed other noncrystalline polymers having a crystallized degree of not more than 20% which is measured by an X-rays diffraction method, within a range of not less than 50% by weight based on the total weight of the composition.

As the polystyrene-based elastomer, for example, there are exemplified a polystyrene, a styrene-acrylonitrile copolymer, a styrene-acrylonitrile-butadiene copolymer (ABS resin), and a styrene-butadiene copolymer (SBR). Further, as a styrene-diene-based block copolymer which is a polystyrene-based elastomer, there are exemplified a styrene-butadiene-styrene block copolymer (SBS), a completely or partially hydrogenated product (SEBS) of the SBS, a styrene-isoprene-styrene block copolymer (SIS), a completely or partially hydrogenated product (SEPS) of theSIS which are obtained by an anion polymerization using an organic alkaline metal compound such as BuLi, etc. as an initiator, in addition to a rubber-contained polystyrene-based resin. Styrene-phase (hard phase) and/or rubber-phase (flexible phase) in the elastomers may include a vinyl compound or a diene compound other than styrene, butadiene or isoprene, and chain structures in the elastomers may be linear, branched, and radial.

Still further, there is also included an epoxy-modified product in which olefin units are epoxidized and a partially-modified elastomer which is grafted by (meth) acrylic acid or a glycidyl methacrylate.

As the polyacrylic-based resin, for example, there are exemplified a polymethyl (meth) acrylate and a copolymer of a (meth)acrylate, etc.

As the vinyl-based resin, for example, there are exemplified a polyvinylacetate, a polyvinylchloride, and a polyvinylidene chloride, etc.

As the polyolefin-based resin or the elastomer thereof, for example, there are exemplified a diene-based elastomer such as a polybutadiene and a polyisoprene, an ethylene-propylene copolymer, and an ethylene-propylene-ethylene terpolymer, etc.

Moreover, there are exemplified a polycarbonate resin, a polyphenylene ether-based resin, and a butylal resin, etc.

The noncrystalline polymer (A) in the present invention has a number average molecular weight ranging from 10,000 to 300,000, preferably from 40,000 to 200,000, and more preferably from 60,000 to 150,000. In the case that the above-mentioned molecular weight is less than 10,000, it is difficult to prepare a variety of crosslinked molded articles which are a desired product, and even though prepared, mechanical strength becomes lower and, contrarily, in the case of exceeding 300,000, melt viscosity becomes excessively high, unpreferably resulting in that there lowers processability in molding.

The crosslinkable monomer (B) in the present invention includes a multifunctional acrylic-based monomer or a multifunctional allyl-based monomer, and a monomer mixture thereof. As the multifunctional acrylic-based monomer, there are exemplified an ethyleneoxide-modified bisphenol A di(meth)acrylate, 1,4-butanediol di(meth)acrylate, diethyleneglycol di(meth)acrylate, dipentaerythritol hexa(meth) acrylate, dipentaerythritol monohydroxy penta(meth) acrylate, a caprolactone-modified dipentaerythritol hexa (meth)acrylate, pentaerythritol tri(meth)acrylate, pentaerythritol tetra(meth)acrylate, a polyethyleneglycol di(meth)acrylate, trimethylolpropane tri(meth)acrylate, an ethyleneoxide-modified trimethylolpropane tri(meth) acrylate, a propyleneoxide-modified trimethylolpropane tri (meth)acrylate, tris(acryloxyethyl)isocyanurate, tris (methacryloxyethyl) isocyanurate, and a mixture thereof.

In particular, tris(acryloxyethyl)isocyanurate [that is, tris (2-hydroxyethyl)isocyanuric triacrylate] can be preferably employed because of a low irritative property to skins. It is to be noted that the (meth)acrylate in the present invention includes an acrylate and a methacrylate.

As the multifunctional allyl-based monomer, there are exemplified triallylcyanurate, triallylisocyanurate, diallylphthalate, diallylbenzene phosphonate, and a mixture thereof.

In the crosslinkable polymer composition of the present invention, the crosslinkable monomer (B) is mixed in an amount ranging from 0.1 to 30 parts by weight, preferably from 0.2 to 20 parts by weight, and more preferably from 0.3 to 10 parts by weight based on 100 parts by weight of the noncrystalline polymer (A).

In the case that the amount of the crosslinkable monomer (B) is less than 0.1 part by weight, molecular chains in the noncrystalline polymer (A) cannot be sufficiently bound, resulting in that chemical resistance, oil resistance, and scratch resistance cannot be satisfactorily improved and, contrarily, in the case of exceeding 30 parts by weight, a crosslinked molded article obtained becomes excessively rigid, unpreferably resulting in that ductility tends to lower.

In the crosslinkable polymer composition of the present invention, there can be optionally mixed an additive such as initiators, catalysts, and stabilizers, etc. The additive may be mixed either into the crosslinkable monomer (B) or into the noncrystalline polymer (A), and which is not particularly limited so far as it can be crosslinked by irradiation of active energy rays. In a polymer in which there are caused cleavage of molecular chains, generation of odors, or discoloration, stabilizers are preferably mixed. For example, in the case that an ultraviolet ray is employed as the active energy rays, there can be exemplified an acetophenone-based, benzoin-based, benzophenone-based, thioxanthine-based photoinitiators, promoters or accelerators thereof.

Further, as components other than resins, there can be optionally mixed additives such as fillers, thermoplastic resins other than the polymer (A) or curable oligomers, a flame retardant, an anti-static agent, an agent for preventing mildew, a plasticizer, and a thickener, and moreover, inorganic fillers such as fiber glass, glass beads, metal powders, talc, mica, and silica, etc., organic fillers, and further, dyes and pigments, etc.

<Process for the preparation of a crosslinked molded article>

According to a second aspect of the present invention, there is provided a crosslinked molded article obtained by irradiation of an active energy ray after molding the crosslinkable polymer composition of the first aspect.

According to a third aspect of the present invention, there is provided a process for the preparation of a crosslinked molded article which comprises irradiating an active energy ray after molding the crosslinkable polymer composition of the first aspect. Molding methods include a compression molding, a vacuum molding, a blow molding, and an injection molding or a foaming molding.

The crosslinked molded article of the present invention is characterized by crosslinking the crosslinkable monomer (B) contained in the composition through irradiation of active energy rays, after the above-mentioned crosslinkable polymer composition is kneaded in melting, and then molded as a variety of molded articles such as sheets, films, textiles, monofilament, nonwoven clothes, trays, vessels, and packages, etc.

The crosslinkable polymer composition of the present invention can be kneaded and molded by a method in which there are employed conventional melt kneaders or molding machines.

As the melt kneaders, there can be exemplified an extruder, a kneader, a roll, and a static mixer, etc.

As the molding machines, there can be exemplified an extrusion molding machine, a compression molding machine, a vacuum molding machine, a blow molding machine, a T-die molding machine, an injection molding machine, an inflation molding machine, and a press-type molding machine, etc.

In the present invention, the crosslinkable polymer composition is molded by an extrusion molding, a compression molding, a vacuum molding, a blow molding, an injection molding, and a foam molding, etc. using the above-mentioned melt kneaders or molding machines, followed by irradiating active energy rays.

It is to be noted that a molded article may be surface-treated, for example, by a method such as coating of other resins at an appropriate period during irradiating active energy rays after molding the crosslinkable polymer composition.

As the active energy rays to be employed, there are exemplified an electromagnetic wave, an electronic beam (EB) and/or a corpuscular beam, and a combination thereof. As the electromagnetic wave, an ultraviolet ray (UV) and an X-ray are exemplified. The active energy rays can be irradiated using apparatuses which are publicly known.

In the case that the electronic beam (EB) is employed, appropriate acceleration voltage ranges from 100 to 5,000, and appropriate exposure ranges from 0.1 to 30 MRad.

Temperature during irradiating the active energy rays can be appropriately selected according to the kind of the noncrystalline polymer (A) and the crosslinkable monomer (B), and the mixing proportion thereof, etc., and a crosslinked molded article can be obtained even at room temperatures and, further, a crosslinked molded article can be also obtained by irradiating while maintaining the molded article at a temperature when being molded. For that reason, although it has been difficult to prepare a molded article by thermally curing, a molded article having an excellent shape-retention property can be molded by the use of the crosslinkable polymer composition according to the present invention. In the case that a molded article is prepared by the use of the crosslinkable polymer composition according to the present invention, a molded sheet includes an insulating sheet, a sheet for hot-melt adhesion, and a sheet for a heat insulator, etc.

The sheet for hot-melt adhesion obtained from the crosslinkable polymer composition of the present invention is exceedingly excellent in a shape-retention property during thermally adhering.

The molded article of the present invention is excellent in chemical resistance, oil resistance, and scratch resistance, and it can be employed in uses which have not been conventionally employed, owing to mixing the crosslinkable monomer (B).

Specifically, there are exemplified materials for a floor carpet, an opening trim, a weather strip, a door trim, materials for covering an internal portion of a trunk, materials for a ceiling, artificial leather products such as materials for covering a sheet, foamed materials, materials for a cushion, materials for soft pads in an instrument panel, a variety of packing materials, protection covers such as a cover for a knob in a change over switch, sheets for insulating, heat insulators, sheets such as a sheet for hot-melt adhesion and, further, films, textiles, monofilament, bottles, tapes, covered cables, tubes, parts for cars such as a belt or a gear, parts for home electric appliances, parts for machines, and materials for construction, etc.

According to a fourth aspect of the present invention, there is provided a crosslinkable polymer composition which comprises 100 parts by weight of a crystalline polymer (A) having a number average molecular weight ranging from 10,000 to 300,000 and a melting point of not less than 90° C., and 0.1 to 30 parts by weight of a crosslinkable monomer (B) which can bind molecular chains of the crystalline polymer (A) by the irradiation of an active energy ray.

According to a fifth aspect of the present invention, there is provided a process for the preparation of a crosslinked molded article which comprises irradiating an active energy ray after molding the crosslinkable polymer composition of the fourth aspect.

According to a sixth aspect of the present invention, there is provided a crosslinked molded article obtained by irradiation of an active energy ray after molding the crosslinkable polymer composition of the fourth aspect. Molding methods include a compression molding, a vacuum molding, a blow molding, and an injection molding or a foaming molding.

The crystalline polymer (A) is essentially required to be a melting point of not less than 90° C. In the case that the melting point is less than 90° C., a molded article is limited in view of storage and conveyance.

There is not particularly limited the crystalline polymer (A) having a melting point of not less than 90° C. to be employed in the present invention, and almost of publicly known crystalline polymers can be employed. For example, there are exemplified polyolefin resins such as a polyethylene, a polypropylene, and a crystalline copolymerized polyolefin, aliphatic polyesters such as a polylactic resin, a polyhydroxy butyric acid resin, and a polybutylene succinate resin, aromatic polyesters such as a polyethylene terephthalate, a polybutylene terephthalate, and a polybutylene isophthalate, polyether-based resins such as a polyoxymethylene resin, a polyoxymethylene copolymer, or a polyethylene oxide or polypropylene oxide polymer, polyamide resins such as a nylon 6, and nylon 66.

Of those, there is preferably employed the polybutylene succinate resin or a mixture with a polycaprolactone because of excellent biodegradability.

The crystalline polymer (A) in the fourth aspect of the present invention has a number average molecular weight ranging from 10,000 to 300,000, preferably from 40,000 to 200,000, and more preferably from 60,000 to 150,000. In the case that the above-mentioned molecular weight is less than 10,000, it is difficult to prepare a variety of crosslinked molded articles which are a desired product, and even though prepared, mechanical strength becomes lower and, contrarily, in the case of exceeding 300,000, melt viscosity is excessively high, unpreferably resulting in that there lowers processability in molding.

The crosslinkable monomer (B) in the fourth aspect of the present invention includes a multifunctional acrylic-based monomer or a multifunctional allyl-based monomer, and a monomer mixture thereof. As the multifunctional acrylic-based monomer, there are exemplified an ethyleneoxide-modified bisphenol A di(meth)acrylate, 1,4-butanediol di(meth)acrylate, diethyleneglycol di(meth)acrylate, dipentaerythritol hexa(meth)acrylate, dipentaerythritol monohydroxy penta(meth)acrylate, a caprolactone-modified dipentaerythritol hexa(meth)acrylate, pentaerythritol tri(meth)acrylate, pentaerythritol tetra(meth)acrylate, a polyethyleneglycol di(meth)acrylate, trimethylolpropane tri(meth)acrylate, an ethyleneoxide-modified trimethylolpropane tri(meth)acrylate, a propyleneoxide-modified trimethylolpropane tri(meth)acrylate, tris(acryloxyethyl) isocyanurate, tris(methacryloxyethyl) isocyanurate, and a mixture thereof.

Of those, tris(acryloxyethyl)isocyanurate can be preferably employed because of a low irritative property to skins.

Further, there can be employed a crosslinkable monomer capable of being cured by irradiation of an active energy ray after mixing initiators, catalysts, and stabilizers, etc., without any limitations. Of those, a variety of stabilizers are preferably mixed in order to prevent cleavage of molecular chains, generation of odor, and discoloration in molded articles.

As the multifunctional allyl-based monomer, there are exemplified triallylcyanurate, triallylisocyanurate, diallylphthalate, diallylbenzene phosphonate, and a mixture thereof.

In the crosslinkable polymer composition of the present invention, the crosslinkable monomer (B) is mixed in an amount ranging from 0.1 to 30 parts by weight, preferably from 0.2 to 20 parts by weight, and more preferably from 0.3 to 10 parts by weight based on 100 parts by weight of the crystalline polymer (A).

In the case that the amount of the crosslinkable monomer (B) is less than 0.1 part by weight, molecular chains in the crystalline polymer (A) cannot be sufficiently bound, resulting in that chemical resistance, oil resistance, and scratch resistance cannot be satisfactorily improved and, contrarily, in the case of exceeding 30 parts by weight, a crosslinked molded article obtained becomes excessively rigid, unpreferably resulting in that ductility tends to lower.

In the crosslinkable polymer composition of the fourth aspect in the present invention, there can be optionally mixed an additive such as initiators, catalysts, and stabilizers, etc.

The additive may be mixed either into the crosslinkable monomer (B) or into the crystalline polymer (A), which is not particularly limited so far as it can be crosslinked by irradiation of active energy rays. In a polymer in which there are caused cleavage of molecular chain, generation of odors, or discoloration, stabilizers are preferably mixed. For example, in the case that an ultraviolet ray is employed as the active energy rays, there can be exemplified an acetophenone-based, benzoin-based, benzophenone-based, thioxanthine-based photo-initiators, promoters or accelerators thereof.

For example, in the case that an ultraviolet ray is employed as an active energy ray, there are preferably employed the acetophenone-based, benzoin-based, benzophenone-based, thioxanthine-based photo-initiators, and promoters or accelerators thereof.

Further, in the crosslinkable polymer composition of the fourth aspect in the present invention, there can be optionally mixed a variety of additives to be employed in the first aspect of the present invention, which are described hereinabove.

The crosslinked molded article of the fifth aspect of the present invention can be also prepared according to the nearly same methods to be employed in the second aspect which are described hereinabove, except the combination of starting raw materials. That is, the crosslinkable polymer composition of the fourth aspect in the present invention can be kneaded and molded by a method in which there are employed conventional melt kneaders or molding machines. As the melt kneaders, there can be exemplified an extruder, a kneader, a roll, and a static mixer, etc.

As the molding machines, there can be exemplified an extrusion molding machine, a compression molding machine, a vacuum molding machine, a blow molding machine, a T-die molding machine, an injection molding machine, an inflation molding machine, and a press-type molding machine, etc.

In order to prepare the molded article of the fifth aspect in the present invention, the crosslinkable polymer composition of the forth aspect is molded by an extrusion molding, a compression molding, a vacuum molding, a blow molding, an injection molding, and a foam molding, etc. using the above-mentioned melt kneaders or molding machines, followed by irradiating active energy rays.

It is to be noted that a molded article may be surface-treated, for example, by a method such as coating of other resins at a reasonable period during irradiating active energy rays after molding the crosslinkable polymer composition.

As the active energy rays to be employed, there are exemplified an electromagnetic wave, an electronic beam (EB) and/or a corpuscular beam, and a combination thereof. As the electromagnetic wave, an ultraviolet ray (UV) and an X-ray are exemplified. The active energy rays can be irradiated using apparatuses which are publicly known.

In the case that the electronic beam (EB) is employed, reasonable acceleration voltage ranges from 100 to 5,000, and appropriate exposure ranges from 0.1 to 30 MRad.

The crosslinked molded article of the fifth aspect of the present invention can be employed in fields such as films, textiles, vessels, covered cables prepared by coatings or an alloy, tubes, parts for cars or home electric appliances such as belts or gears, in which there are employed conventional crystalline polymers such as a polyethyleneterephthalate, a nylon, a polyacetal, a polyethylene, and a polypropylene, etc.

According to a seventh aspect of the present invention, there is provided crosslinked nonwoven cloth having a shape-memory property which comprises crosslinking by irradiating an active energy ray.

According to an eighth aspect of the present invention, there is provided a process for the preparation of crosslinked nonwoven cloth characterized by the steps;

(a) spinning a resin composition composed of 100 parts by weight of a polymer (A) and 0.1 to 30 parts by weight of a crosslinkable monomer (B) which can bind molecular chains of the polymer (A) by irradiation of an active energy ray to prepare fibers, (b) preparing a nonwoven cloth by entangling the fibers, and (c) the nonwoven cloth being irradiated by the active energy ray.

The crosslinked nonwoven cloth in the present invention is prepared by spinning a resin composition composed of 100 parts by weight of a polymer (A) and 0.1 to 30 parts by weight of a crosslinkable monomer (B) which can bind molecular chains of the polymer (A), by preparing a nonwoven cloth by entangling the fibers, and by irradiating an active energy ray to the nonwoven cloth.

The resin composition can be prepared by conventional preparation processes which include a usual method for preparing pellets. In spinning methods for preparing fibers from the pellets, usual methods are also employed without any limitations, and further, a flush spinning method, a melted blow method which is a method in which there are combined a spinning step, an unfastening step of fibers, and a dispersing step.

As preparation methods of the nonwoven cloth from the unfastened fibers, in addition to a publicly known wet method and dry method, there can be employed any one of a spunbond process, a spunlace process, and a melt blow process. Further, as adhesion methods for entangling fibers, there can be employed a thermally calendering adhesion method, a thermal bonding adhesion method, an adhesion method by adhesives, and a needle punching entangling method, and a fluid entangling method, etc.

The polymer (A) includes a polyester resin such as a polyethylene terephthalate resin, a polybutylene terephthalate resin, and a copolymerized polyester resin, etc., a nylon resin, an aramide-based resin, an acrylic-based resin, a polyolefin-based resin such as a polyethylene resin and a polypropylene resin, a polyurethane-based resin, a vinylon-based resin, and a polyvinylchloride-based resin. The polymer (A) may be employed solely or in combination. The combination may be a combination of two kinds of different fibers and a combination of two kinds of different resins for fibers.

In the case that there are employed a copolymerized polyester resin, a polyethylene resin and a polypropylene resin which are a resin having a thermally-adhesive property as fibers for partially mixing, there can be obtained nonwoven cloth which is excellent in a crossover point adhesion.

As the crosslinkable monomer (B) in the nonwoven cloth of the present invention which can bind molecular chains of the noncrystalline polymer (A), there are exemplified a multifunctional acrylic-based monomer or a multifunctional allyl-based monomer, a multifunctional alkyl group-substituted aromatic compound, and a sulphur compound or an alkyl tin compound, and a monomer mixture thereof. As the multifunctional acrylic-based monomer, there are exemplified an ethyleneoxide-modified bisphenol A di(meth) acrylate, 1,4-butanediol di(meth)acrylate, diethyleneglycol di(meth)acrylate, dipentaerythritol hexa(meth)acrylate, dipentaerythritol monohydroxy penta(meth)acrylate, a caprolactone-modified dipentaerythritol hexa(meth) acrylate, pentaerythritol tri(meth)acrylate, pentaerythritol tetra(meth)acrylate, a polyethyleneglycol di(meth)acrylate, trimethylolpropane tri(meth)acrylate, an ethyleneoxide-modified trimethylolpropane tri(meth)acrylate, a propyleneoxide-modified trimethylolpropane tri(meth) acrylate, tr is(acryloxyethyl)isocyanurate, tris (methacryloxyethyl) isocyanurate, and a mixture thereof.

As the multifunctional allyl-based monomer, there are exemplified triallylcyanurate, triallylisocyanurate, diallylphthalate, diallylbenzene phosphonate, and a mixture thereof.

In the crosslinked nonwoven cloth of the present invention, the resin composition is composed of 100 parts by weight of a polymer (A) and 0.1–30 parts by weight, preferably 0.2–20% by weight, and more preferably 0.3–10% by weight of a crosslinkable monomer (B) which can bind molecular chains of the polymer (A).

In the case that the amount of the crosslinkable monomer (B) is less than 0.1 part by weight, molecular chains in the noncrystalline polymer (A) cannot be sufficiently bound, resulting in that chemical resistance, oil resistance, and scratch resistance cannot be satisfactorily improved and, contrarily, in the case of exceeding 30 parts by weight, nonwoven cloth obtained becomes excessively rigid, unpreferably resulting in that soft feel tends to become worse.

Further, in the case that there is employed, as the polymer (A) for nonwoven cloth, a polyethylene resin which is readily cured by an active energy ray, and in which there are only slightly caused cleavage of polymer chains and generation of odors, nonwoven cloth can be also prepared by irradiation of an active energy ray without mixing the crosslinkable monomer (B).

In the nonwoven cloth of the present invention, there can be optionally mixed an additive such as initiators, catalysts, and stabilizers, etc. The additive may be mixed ether into the crosslinkable monomer (B) or into the polymer (A), which is not particularly limited so far as it can be crosslinked by irradiation of active energy rays. In a polymer in which there are caused cleavage of molecular chains, generation of odors, or discoloration, stabilizers are preferably mixed. For example, in the case that an ultraviolet ray is employed as the active energy rays, there can be exemplified an acetophenone-based, benzoin-based, benzophenone-based, thioxanthine-based photo-initiators, promoters or accelerators thereof.

As the active energy rays to be employed, there are exemplified an electromagnetic wave, an electronic beam (EB) and/or a corpuscular beam, and a combination thereof. As the electromagnetic wave, an ultraviolet ray (UV) and an X-ray are exemplified. The active energy rays can be irradiated using apparatuses which are publicly known.

In the present invention, any one of pellets, fibers, and nonwoven cloth can be irradiated by an active energy ray, and an irradiation amount of the active energy rays is preferably as follows.

For example, in the case that a gamma-ray is employed as the active energy rays, an irradiation amount preferably ranges in 0.1–30 MRad, and, in the case that an electronic beam is employed as the active energy rays, an acceleration voltage preferably ranges in 100–5000 KV, and an irradiation dose preferably ranges in 0.1–30 MRad.

In the nonwoven cloth of the present invention, in the case that pellets are prepared from the polymer composition and the pellets are irradiated and spun to prepare nonwoven cloth, fibers having a fine diameter can be obtained, preferably resulting in that there is obtained crosslinked nonwoven cloth which is excellent in soft feel.

Heretofore, in the case that a melt blow method is employed using a polyethylene as a raw material, only nonwoven cloth having a relatively large diameter has been obtained differently from the case of using a polypropylene, a polyethylene terephthalate, and a polyamide, etc. However, in the present invention, fibers having a fine diameter of 0.05–20$\mu$ can be spun by the use of a polyethylene irradiated by an active energy ray, and crosslinked nonwoven cloth by a meltblow method can be exceedingly and effectively obtained.

In a method in which fibers obtained from the crosslinkable polymer composition are irradiated by an active energy ray and nonwoven cloth is prepared, in the case that crosslinked nonwoven cloth is prepared by a spunbond process, the crosslinked nonwoven cloth shows a shape-memory property and improved rigidity, and nonwoven cloth having excellent strength can be effectively prepared from very fine fibers owing to highly-oriented crystallization in the resin because of being capable of stretching in a high speed and high shear. In particular, productivity can be improved in respective steps such as unfastening, dispersing, collecting, transferring, and adhesive connection.

In the case that thermally-adhered crosslinked fibers are employed in the adhesive connection step, there can be obtained crosslinked nonwoven cloth having an excellent crossover point adhesion, an excellent soft feel and water absorption property.

It is to be noted that crosslinked fibers may be partially employed in the nonwoven cloth.

By a method in which the fibers obtained from the crosslinkable polymer composition are not irradiated and the nonwoven cloth prepared from the fibers is irradiated by an active energy ray, there can be obtained crosslinked nonwoven cloth which is excellent in a shape-memory property, rigidity, tear strength, delamination resistance, solvent resistance, soft feel, water absorbable property, property as a filter, washable property, and bacteria resistance, etc. Particularly, in nonwoven cloth obtained by a meltblow process, although fibers diameter is exceedingly fine, and the fibers are excellent in a soft feel and water absorbable property, there is a drawback that tear strength is low. However, the drawback is improved by irradiating the nonwoven cloth by an active energy ray, and there can be obtained crosslinked nonwoven cloth having excellent tear strength.

As described above, in the present invention, there can be obtained crosslinked nonwoven cloth having a shape-memory property, rigidity, tear strength, delamination resistance, solvent resistance, and soft feel. Also, there can be obtained crosslinked nonwoven cloth having excellent water absorbable property, property as a filter, washable property, and soft feel and, further, bulkiness owing to an improvement in a shape retention property by modification of molding conditions.

Accordingly, the nonwoven cloth of the present invention can be widely employed as materials for sanitary napkins and diaper, industrial materials, materials for carpets, and medical materials, etc.

Hereinafter, although the present invention is illustrated below by Examples, the present invention is not limited the Examples.

Properties in the crosslinked molded articles of the present invention were measured according to the following conditions.

(a) Rubbery elasticity in melting: Sheet was heated exceeding a melting point, and was melted, followed by stretching to identify the presence or absence of rubbery elasticity.

(b) Restoration ratio: Sheet having size of 5 mm×4 cm was heated exceeding a melting point, and was stretched to 100% (length of 8 cm), followed by cooling to solidify as it is. Then, in the case that it was melted again, it was measured whether it can be restored to "how many %".

(c) Immersion in a solvent: It was measured at room temperatures for 24 hours.

EXAMPLES 1–4 AND COMPARATIVE EXAMPLES 1–4

According to the proportion as shown in Tables 1 and 2, a polycarbonate resin ("Yupilon S3000" manufactured by Mitsubishi-Gas Kagaku, Ltd.) or an SBS resin ("TR 2000" manufactured by Japan Synthetic Rubber, Ltd.) which is a noncrystalline polymer (A) was melt kneaded together with tris(acryloxyethyl) isocyanurate (Funcryl FA-731A manufactured by Hitachi Kasei, Ltd.) or triallylcyanurate which is a crosslinkable monomer (B) at 200° C. for 5 minutes to obtain a composition.

The composition obtained was molded at 200° C. for 10 minutes with a press-type molding machine to obtain a sheet having the thickness of 0.5 mm. In the sheet, crosslinking reaction was not still caused.

In the case that "I" is described in the Tables, both surfaces of the sheet were irradiated by an electronic beam having acceleration voltage of 200 KV, exposure of 2 MRad, and absorbed dose of 10 KGy at room temperature conditions.

In relation to the sheet obtained, there were measured yield strength (kgf/cm$^2$), strength at break (kgf/cm$^2$), and extension at break (%), immersion in tetrahydrifran, immersion in toluene, a hardness (Shore A), and a hardness (Shore DA).

Results obtained are shown in Tables 1 and 2.

TABLE 1

| Formulation and Physical properties | Example 1 | Example 2 | Comparative Example 1 | Comparative Example 2 |
|---|---|---|---|---|
| Formulation (part by weight): | | | | |
| Noncrystalline polymer (A), Polycarbonate | 97 | 97 | 97 | 97 |
| Crosslinkable monomer (B) TAC | 3 | — | — | — |
| Funcryl | — | 3 | — | — |
| Electronic beam | I | I | — | I |
| Physical properties: | | | | |
| Yield strength (kgf/cm$^2$) | 750 | 740 | 780 | 770 |
| Strength at break (kgf/cm$^2$) | 740 | 710 | 620 | 720 |
| Elongation at break (%) | 30 | 100 | 30 | 20 |
| Immersion in tetrahydrofran at room temperature for 24 hours | S | S | D | D |
| Shore hardness (D) | 83 | 83 | 78 | 80 |

TABLE 2

| Formulation and Physical properties | Example 3 | Example 4 | Comparative Example 3 | Comparative Example 4 |
|---|---|---|---|---|
| Formulation (part by weight): | | | | |
| Noncrystalline polymer (A), SBS (part by weight) | 97 | 97 | 97 | 97 |
| Crosslinkable monomer (B) TAC | 3 | — | — | — |
| Funcryl | 3 | — | — | — |
| Electronic beam | I | I | — | I |
| Physical properties: | | | | |
| Immersion in tetrahydrofran at room temperature for 24 hours | S | PS | D | D |
| Shore hardness (D) | 78 | 78 | 75 | 75 |

From results in the Table 1, although the crosslinked molded article of the present invention is nearly same in yield strength and strength at break compared to those in Comparative Examples, in the case that Funcryl FA-731A is employed as a crosslinkable monomer, elongation at break is more excellent. Further, it is identified that the crosslinked molded article of the present invention is excellent in hardness, and still further, that it is excellent in a solvent resistance from the results of immersion in tetrahydrofran.

From results in the Table 2, it is identified that the crosslinked molded article of the present invention is more excellent in hardness and a solvent resistance.

EXAMPLES 5–8 AND COMPARATIVE EXAMPLE 5

According to the proportion as shown in Table 3, an SBS resin ("TR 2000" manufactured by Japan Synthetic Rubber, Ltd.) which is a polystyrene-based elastomer was melt kneaded together with tris(acryloxyethyl)isocyanurate (Funcryl FA-731A manufactured by Hitachi Kasei, Ltd.) or triallylcyanurate which is a crosslinkable monomer (B) at 180° C. for 10 minutes to obtain a composition. The composition obtained was molded at 180° C. for 10 minutes with a press-type molding machine to obtain a sheet having the thickness of 0.5 mm. In the sheet, crosslinking reaction was not still caused.

The sheet was irradiated by an electronic beam having acceleration voltage of 5000 KV, exposure of 2 MRad, and absorbed dose of 20 KGy at room temperature conditions.

Results are shown in Table 3.

TABLE 3

| Formulation and Physical properties | Example 5 | Example 6 | Example 7 | Example 8 | Comparative Example 5 |
|---|---|---|---|---|---|
| Formulation (part by weight): | | | | | |
| SBS | 100 | 100 | 100 | 100 | 100 |
| Funcryl FA-731A | 2 | 5 | — | — | — |
| Triallylcyanurate | — | — | 10 | 5 | — |
| Physical properties: | | | | | |
| Outer appearance | T | SW | W | T | T |
| 100% Modulus (kg/cm$^2$) | 40 | 40 | 50 | 50 | 40 |
| Strength at break (kg/cm$^2$) | 130 | 260 | 280 | 250 | 90 |

TABLE 3-continued

| Formulation and Physical properties | Example 5 | Example 6 | Example 7 | Example 8 | Comparative Example 5 |
|---|---|---|---|---|---|
| Elongation at break (%) | 610 | 750 | 690 | 780 | 480 |
| Immersion in cyclohexane at room temperature for 1 day | PG | PG | S | S | D |
| Shore hardness (A) | 85 | 90 | 90 | 90 | 80 |

From results in the Table 3, although the crosslinked molded article of the present invention is nearly same in 100% Modulus compared to those in the Comparative Examples, it is identified that the crosslinked molded article of the present invention is excellent in strength at break, elongation at break, hardness, and a solvent resistance.

EXAMPLES 9–12

There was mixed a mixture composed of a polybutylene succinate having a melting point of 115° C. ("Bionole 1003" manufactured by Showa-Kobunshi, Ltd.) and a polycaprolactone (Placcel H manufactured by Daicel Chemical Industries, Ltd.) as a crystalline polymer (A) having a melting point of not less than 90° C. with tris(acryloxyethyl) isocyanurate (Funcryl FA-731A manufactured by Hitachi Kasei, Ltd.) as a crosslinkable monomer (B) in a proportion as shown in Table 1, followed by kneading at 150° C. for 5 minutes to obtain a composition.

The composition obtained was molded at 150° C. for 10 minutes with a press-type molding machine to obtain a sheet having the thickness of 0.5 mm. In the sheet, crosslinking reaction was not still caused. Results obtained are shown in Table 4.

COMPARATIVE EXAMPLES 6 AND 7

For reference, the same crystalline polymer having a melting point of not less than 90° C. as in the Example 1 as a crystalline polymer (A) was employed and irradiated by the same electronic beam except that a crosslinkable monomer (B) was not employed.

Results obtained are shown in Table 4.

TABLE 4

| Formulation and Physical properties | Example | | | | Comparative Example | |
|---|---|---|---|---|---|---|
|  | 9 | 10 | 11 | 12 | 6 | 7 |
| Formulation (part by weight): | | | | | | |
| Polybutylene succinate (a melting point of 115° C.) | 100 | 100 | 70 | 70 | 100 | 70 |
| Polycaprolactone (a melting point of 60° C.) | — | — | 30 | 30 | — | 30 |
| Funcryl FA-731A | 3 | — | 3 | — | — | — |
| Triallylcyanurate | — | 3 | — | 3 | — | — |
| Physical properties: | | | | | | |
| Outer appearance in melting | E | E | E | E | E | E |
| Rubbery elasticity in melting | P | P | P | P | A | A |
| Restoration ratio (%) | 100 | 100 | 95 | 95 | 0 | 0 |
| Immersion in chloroform | I | I | S | S | D | D |

EXAMPLES 13–14

The same operations were followed as in Example 9, except that there was employed a polylactic acid resin having a melting point of 180° C. ["Lacty 1012" manufactured by Shimadzu Seisakusyo, Ltd.] or a copolymer ["Biopore D4000" manufactured Nihon Monsanto, Ltd.] composed of a poly(3-hydroxybutyric acid) and a poly(3-hydroxyvaleric acid) having a melting point of 153° C. as a crystalline polymer (A) having a melting point of not less than 90° C., and molding temperature was changed to 180° C.

Results obtained are shown in Table 5.

COMPARATIVE EXAMPLES 8 AND 9

For reference, the same operations were followed as in Example 9, except that there was employed a polylactic acid resin having a melting point of 180° C. ["Lacty 1012" manufactured by Shimadzu Seisakusyo, Ltd.] or a copolymer ["Biopore D4000" manufactured Nihon Monsanto, Ltd.] composed of a poly(3-hydroxybutyric acid) and a poly(3-hydroxyvaleric acid) having a melting point of 153° C. as a crystalline polymer (A) having a melting point of not less than 90° C., and the crosslinkable monomer (B) was not employed. Results obtained are shown in Table 5.

TABLE 5

| Formulation and Physical properties | Example 13 | Example 14 | Comparative Example 8 | Comparative Example 9 |
|---|---|---|---|---|
| Formulation (part by weight): | | | | |
| Polylactic acid (a melting point of 180° C.) | 100 | — | 100 | — |
| PHB-PHV (a melting point of 153° C.) | — | 100 | — | 100 |
| Funcryl FA-731A | 3 | 3 | — | — |

TABLE 5-continued

| Formulation and Physical properties | Example 13 | Example 14 | Comparative Example 8 | Comparative Example 9 |
|---|---|---|---|---|
| Physical properties: | | | | |
| Outer appearance in melting | E | E | E | E |
| Rubbery elasticity in melting | P | P | A | A |
| Restoration ratio (%) | 90 | 95 | 0 | 0 |
| Immersion in chloroform | S | S | D | D |

EXAMPLE 15

There was mixed a mixture composed of 70 parts by weight of a polybutylene succinate having a melting point of 115° C. ("Bionole 1001" manufactured by Showa-Kobunshi, Ltd.) and 30 parts by weight of a polycaprolactone (Placcel H manufactured by Daicel Chemical Industries, Ltd.) which is a polymer (A) with tris (acryloxyethyl)isocyanurate (Funcryl FA-731A manufactured by Hitachi Kasei, Ltd.) which is a crosslinkable monomer (B) in a proportion of 100/5 by weight, followed by being spun in melting to prepare fibers.

Subsequently, the fibers obtained by melt spinning were irradiated by a gamma-ray having an acceleration voltage of 5000 KV and exposure of 2 MRad to prepare crosslinked fibers.

Independently, a polyethylene terephthalate resin was spun in melting to obtain fibers. The fibers were finely dispersed together with the above-described crosslinked fibers by air-jetting with a speed of 5000 m/min and cooled, followed by being unfastened/dispersed with a shock wave, and collected/transferred to entangle. Subsequently, nonwoven cloth was obtained by adhering the fibers by a continuous through-air method. In the nonwoven cloth, fibrous shape was maintained even after melting, fibers were entangled each other at crossed points, and there was obtained nonwoven cloth which is excellent in crossover point adhesion, bulkiness, and a soft feel.

COMPARATIVE EXAMPLE 10

The same procedures were followed as in Example 15, except that the crosslinkable monomer (B) was not employed to obtain nonwoven cloth. However, a fibrous shape was not able to be maintained in through-air adhesion, and the nonwoven cloth was melt adhered such as a shape of a plate.

What is claimed is:

1. A crosslinkable polymer composition which comprises 100 parts by weight of a noncrystalline polymer (A) having a number average molecular weight ranging from 10,000 to 300,000 and 0.1 to 30 parts by weight of a crosslinkable monomer (B) which can bind molecular chains of the noncrystalline polymer (A) by the irradiation of an active energy ray.

2. A crosslinkable polymer composition as set forth in claim 1, wherein said noncrystalline polymer is a polystyrene-based resin or an elastomer thereof, an acrylic-based resin, a vinyl-based resin, a polycarbonate resin, a polyphenylene-ether-based resin, a butylal resin, a polyolefin-based resin or elastomer thereof, and a mixture thereof.

3. A crosslinkable polymer composition as set forth in claim 2, wherein said polystyrene-based resin is a polystyrene, a styrene-acrylonitrile copolymer, a styrene-acrylonitrile-butadiene copolymer, a styrene-butadiene copolymer, and a styrene-diene-based block copolymer.

4. A crosslinkable polymer composition as set forth in claim 2, wherein said acrylic-based resin is a polymethyl (meth)acrylate or a copolymer of a (meth)acrylate.

5. A crosslinkable polymer composition as set forth in claim 2, wherein said vinyl-based resin is a polyvinylacetate, a polyvinylchloride, or a polyvinylidenechloride.

6. A crosslinkable polymer composition as set forth in claim 1, wherein said polyolefin-based resin or elastomer thereof is a polybutadiene, a polyisoprene, or an ethylene-propylene copolymer.

7. A crosslinkable polymer composition as set forth in any one of claims 1 to 6, wherein said crosslinkable monomer (B) is a multifunctional acrylic-based monomer or a multifunctional allyl-based monomer.

8. A crosslinkable polymer composition as set forth in claim 7, wherein said multifunctional acrylic-based monomer is at least one selected from the group consisting of an ethyleneoxide-modified bisphenol A di(meth)acrylate, 1,4-butanediol di(meth)acrylate, diethyleneglycoldi(meth) acrylate,dipentaerythritolhexacrylate, dipentaerythritol monohydroxypentacrylate, a caprolactone-modified dipentaerythritol hexacrylate, pentaerythritol tri(meth)-acrylate, pentaerythritol tetra(meth)acrylate, a polyethyleneglycol di(meth)acrylate, trimethylolpropane triacrylate, an ethyleneoxide-modified trimethylolpropane tri(meth) acrylate, a propyleneoxide-modified trimethylolpropane tri (meth)acrylate, tris(acryloxyethyl)isocyanurate, tris (methacryloxyethyl) isocyanurate, and a mixture thereof.

9. A crosslinkable polymer composition as set forth in any one of claims 1 to 8, wherein said active energy ray is an electromagnetic wave, an electronic beam and/or a corpuscular beam.

10. A crosslinkable polymer composition as set forth in any one of claims 1 to 8, wherein said active energy ray is an ultraviolet ray.

11. A crosslinked molded article obtained by irradiation of an active energy ray after molding a crosslinkable polymer composition as set forth in any one of claims 1 to 8.

12. A crosslinked molded article as set forth in claim 11, wherein said molded article is obtained by a compression molding, a vacuum molding, a blow molding, and an injection molding or a foaming molding.

13. A process for the preparation of a crosslinked molded article which comprises irradiating an active energy ray after molding a crosslinkable polymer composition as set forth in any one of claims 1 to 8.

14. A crosslinked molded article as set forth in claim 10, wherein said crosslinked molded article is a sheet, a film, a textile, a monofilament, a tape, or a vessel.

15. A crosslinkable polymer composition which comprises 100 parts by weight of a crystalline polymer (A) having a number average molecular weight ranging from 10,000 to 300,000 and a melting point of not less than 90° C., and containing 0.1 to 30 parts by weight of a crosslinkable monomer (B) which can bind molecular chains of the crystalline polymer (A) by the irradiation of an active energy ray.

16. A crosslinkable polymer composition as set forth in claim 15, wherein said crystalline polymer is at least one selected from the group consisting of a polyolef in resin, an aliphatic polyester, an aromatic polyester, a polyether-based resin, a polyamide resin, a polyvinyl alcohol resin, or a mixture thereof.

17. A crosslinkable polymer composition as set forth in claim 16, wherein said polyolefin resin is at least one selected from the group consisting of a polyethylene, a polypropylene, a crystalline copolymerized polyolefin, or a mixture thereof.

18. A crosslinkable polymer composition as set forth in claim 16, wherein said aliphatic polyester is at least one selected from the group consisting of a polylactic resin, a polyhydroxy butyric acid resin, a polybutylene succinate resin, a copolymer composed of monomers in the resins, or a mixture thereof.

19. A crosslinkable polymer composition as set forth in claim 18, wherein said polybutylene succinate resin is a mixture with a polycaprolactone.

20. A crosslinkable polymer composition as set forth in claim 16, wherein said aromatic polyester is at least one selected from the group consisting of a polyethylene terephthalate, a polybutylene terephthalate, a polybutylene isophthalate, a copolymer composed of monomers in the resins, or a mixture thereof.

21. A crosslinkable polymer composition as set forth in claim 15, wherein said polyether-based resin is at least one selected from the group consisting of a polyoxymethylene resin, a polyoxymethylene copolymer, or a polyethylene oxide or polypropylene oxide polymer.

22. A crosslinkable polymer composition as set forth in claim 15, wherein said polyamide resin is at least one selected from the group consisting of a nylon 6, nylon 66, nylon 12, or a mixture thereof.

23. A crosslinkable polymer composition as set forth in any one of claims 15 to 22, wherein said crosslinkable monomer (B) is a multifunctional acrylic-based monomer or a multifunctional allyl-based monomer.

24. A crosslinkable polymer composition as set forth in claim 23, wherein said multifunctional acrylic-based monomer is at least one selected from the group consisting of an ethyleneoxide-modified bisphenol A di(meth)acrylate, 1,4-butanediol di(meth)acrylate, diethyleneglycoldi(meth)acrylate, dipentaerythritolhexacrylate, dipentaerythritol monohydroxypentacrylate, a caprolactone-modified dipentaerythritol hexacrylate, pentaerythritol tri(meth)-acrylate, pentaerythritol tetra(meth)acrylate, a polyethyleneglycol di(meth)acrylate, trimethylolpropane triacrylate, an ethyleneoxide-modified trimethylolpropane tri(meth) acrylate, a propyleneoxide-modified trimethylolpropane tri(meth)acrylate, tris(acryloxyethyl) isocyanurate, tris (methacryloxyethyl) isocyanurate, and a mixture thereof.

25. A crosslinkable polymer composition as set forth in claim 23, wherein said multifunctional allyl-based monomer is at least one selected from the group consisting of triallycyanurate, triallyisocyanurate, diallylphthalate, diallylbenzenephosphonate, and a mixture thereof.

26. A crosslinkable polymer composition as set forth in claim 15, wherein said active energy ray is an electromagnetic wave, an electronic beam and/or a corpuscular beam.

27. A process for the preparation of a crosslinked molded article which comprises irradiating an active energy ray after molding the crosslinkable polymer composition as set forth in any one of claims 15 to 26.

28. A crosslinked molded article obtained by irradiation of an active energy ray after molding the crosslinkable polymer composition as set forth in any one of claims 15 to 26 by a compression molding, a vacuum molding, a blow molding, and an injection molding or a foaming molding.

29. A crosslinked molded article as set forth in claim 28, wherein said article is a sheet, a film, a textile, a monofilament, a tape, or a vessel.

30. Crosslinked nonwoven cloth having a shape-memory property which comprises crosslinking by irradiating an active energy ray.

31. A process for the preparation of crosslinked nonwoven cloth characterized by the steps;
   (a) spinning a resin composition composed of 100 parts by weight of a polymer (A) and 0.1 to 30 parts by weight of a crosslinkable monomer (B) which can bind molecular chains of said polymer (A) by irradiation of an active energy ray to prepare fibers,
   (b) preparing a nonwoven cloth by entangling said fibers, and
   (c) said nonwoven cloth being irradiated by said active energy ray.

32. A process for the preparation of crosslinked nonwoven cloth as set forth in claim 31, wherein said polymer (A) is any one selected from the group consisting of a polyester resin, a nylon resin, an aramide-based resin, an acrylic-based resin, a polyolefin-based resin, a polyurethane-based resin, a vinylon-based resin, and a polyvinylchloride-based resin.

33. A process for the preparation of crosslinked nonwoven cloth as set forth in claim 31, wherein said nonwoven cloth is prepared by any one of a spunbond process, a spunlace process, and a melt blow process.

34. A process for the preparation of crosslinked nonwoven cloth as set forth in claim 31, wherein said crosslinkable monomer (B) which can bind molecular chains of said polymer (A) is at least one selected from the group consisting of a multifunctional acrylic-based monomer, a multifunctional allyl-based monomer, a multifunctional alkyl group-substituted aromatic compound, and a sulphur compound or an alkyl tin compound.

* * * * *